(12) United States Patent
Morita et al.

(10) Patent No.: US 7,076,566 B1
(45) Date of Patent: Jul. 11, 2006

(54) MULTI-LINE COMMUNICATION APPARATUS AND METHOD OF USE

(75) Inventors: Kenichi Morita, Toyohashi (JP); Keisuke Hashimoto, Toyokawa (JP); Kenichi Takahashi, Toyohashi (JP)

(73) Assignee: Minolta Co., Ltd., Osaka (JP)

( * ) Notice: Subject to any disclaimer, the term of this patent is extended or adjusted under 35 U.S.C. 154(b) by 631 days.

(21) Appl. No.: 09/631,414

(22) Filed: Aug. 3, 2000

(30) Foreign Application Priority Data

Aug. 6, 1999 (JP) ................................. 11-223622

(51) Int. Cl.
*G06F 15/16* (2006.01)
(52) U.S. Cl. ...................................... 709/245; 709/229
(58) Field of Classification Search ................ 709/245, 709/227; 358/1.15, 448, 407, 440, 402
See application file for complete search history.

(56) References Cited

U.S. PATENT DOCUMENTS

| 5,521,719 | A | * | 5/1996 | Yamada | 358/438 |
| 5,995,240 | A | * | 11/1999 | Sato | 358/407 |
| 6,005,677 | A | * | 12/1999 | Suzuki | 358/442 |
| 6,421,672 | B1 | * | 7/2002 | McAllister et al. | 707/10 |
| 6,437,873 | B1 | * | 8/2002 | Maeda | 358/1.15 |
| 6,466,330 | B1 | * | 10/2002 | Mori | 358/1.15 |
| 6,542,472 | B1 | * | 4/2003 | Onuma | 370/253 |
| 6,721,071 | B1 | * | 4/2004 | Maruyama | 358/440 |
| 2003/0107776 | A1 | * | 6/2003 | Maeda | 358/402 |

FOREIGN PATENT DOCUMENTS

| JP | 10-98604 A | 4/1998 |
| JP | 10-145574 A | 5/1998 |
| JP | 10-155038 A | 6/1998 |

* cited by examiner

*Primary Examiner*—Paul H. Kang
(74) *Attorney, Agent, or Firm*—Sidley Austin LLP

(57) ABSTRACT

A data communication apparatus determines whether or not data are being transmitted, and receives the image data when data have been transmitted. Then, a plurality of address data of the sending side are obtained. Then, the obtained plurality of address data of the sending side are recorded in an address memory. Finally, the apparatus transmits its own plurality of address data to the obtained address of the sending side, and the reception process ends.

15 Claims, 11 Drawing Sheets

MULTI-LINE COMMUNICATION APPARATUS AND METHOD OF USE

This application is based on Patent Application No. 11-223622 filed in Japan, the content of which is hereby incorporated by reference.

BACKGROUND OF THE INVENTION

1. Field of the Invention

The present invention relates to a data communication apparatus and method of data communication, and specifically relates to a data communication apparatus and data communication method capable of transmitting data over a plurality of communication lines such as internet line and the like in addition to a telephone line.

2. Description of the Related Art

In conventional data communication apparatuses such as facsimile apparatuses and the like, communicant destinations (transmission destinations) and their address data are recorded in memory beforehand. Then, according to the known art, during actual transmission, the data transmission is executed to the address destination recorded in memory only for the specified transmission destination.

In such data communication apparatuses capable of recording communicant information, however, the address data of communicant destinations must be recorded by manual input one at a time, and this recording operation is a major burden for the operator.

Accordingly, in order to reduce the labor of the operator required for the recording operation, Japanese Laid-Open Patent Application No. 10-98604, for example, discloses art allowing automated recording by transmitting the information of recorded transmission destinations to another data communication apparatus.

In the art disclosed in Japanese Laid-Open Patent No. 10-98604, however, information of a transmission destination recorded in memory of a specific data communication apparatus is simply transmitted to a single other data communication apparatus. For this reason, the transmitted information may be communicant destination information that is unnecessary to the other data communication apparatus, and the necessary communicant destination information may be omitted. In such instances, it becomes necessary to perform an operation to correct (add or delete) the new communicant destination information.

Particularly in recent years the upgrading of the communication infrastructure has led to the popularization of data communication apparatuses capable of using not only public telephone lines, but also a plurality of lines including internet lines and LAN lines and the like. A representative data communication apparatus is, for example, the internet facsimile apparatus. In such data communication apparatuses, the correction operation required after the transmission of the communication destination information has become remarkably problematic, greatly increasing the burden on the operator.

That is, in data communication apparatuses capable of using a plurality of lines, the data communication apparatus itself will have a plurality of addresses corresponding to the plurality of lines. For this reason, a plurality of address data for a single communicant destination (transmission destination) must be recorded together in memory.

Accordingly, the amount of communicant destination data recorded in memory greatly increases compared to when data of a single address are recorded. Similarly, the operation of recording communicant address data one at a time performed by the operator is markedly increased.

SUMMARY OF THE INVENTION

An object of the present invention is to eliminate the previously described disadvantages by providing a data communication apparatus and method of data communication capable of reducing the recording operation for communicant address data.

In order to attain said objects, the data communication apparatus of present invention has a specification unit for specifying a transmission destination; and a transmission unit for transmitting a plurality of its own address data corresponding to each of the plurality of communication lines to the specified transmission destination.

In order to attain said objects, the another data communication apparatus of present invention has a receiving unit for receiving at least one of address data of another data communication apparatus; a recording unit for recording the address data received by the receiving unit; and a transmission unit for transmitting at least one of its own address data to the address recorded by the recording unit.

In the following description, like parts are designated by like reference numbers throughout the several drawings.

DETAILED DESCRIPTION OF THE PREFERRED EMBODIMENTS

Figure 1:
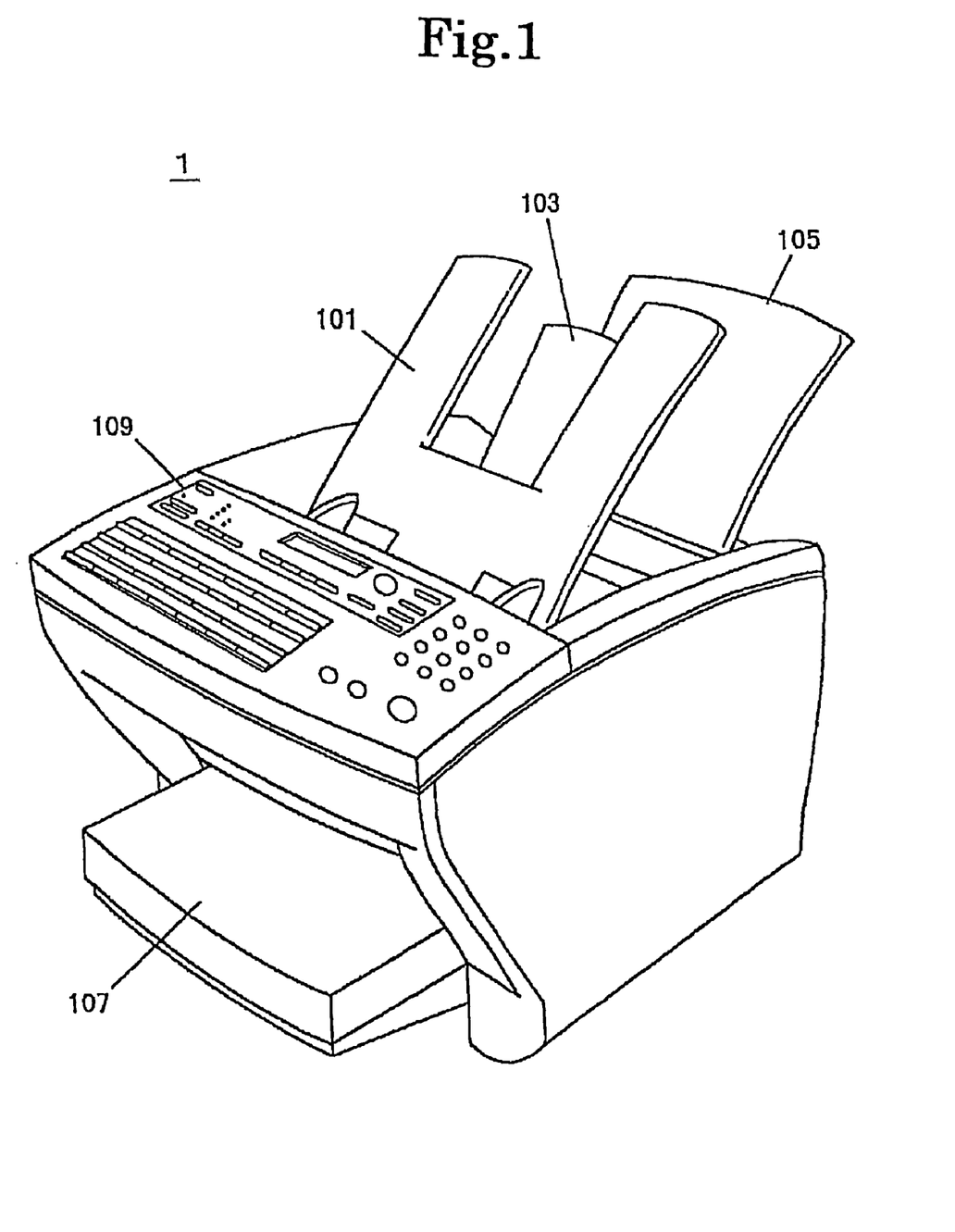
FIG. 1 is an exterior view of a data communication apparatus 1 of an embodiment of the present invention.

A first embodiment of the present invention is described hereinafter with reference to the accompanying drawings. FIG. 1 shows an exterior view of a data communication apparatus 1 of an embodiment of the present invention. A document feed tray 101 supplies document images for transmission. A document discharge tray 103 ejects the read document image. A recording sheet feed tray 107 supplies recording sheets to printout the reception data. A recording sheet discharge tray 105 ejects the printed recording sheets. An operation panel 109 operates the data communication apparatus 1.

Figure 2:
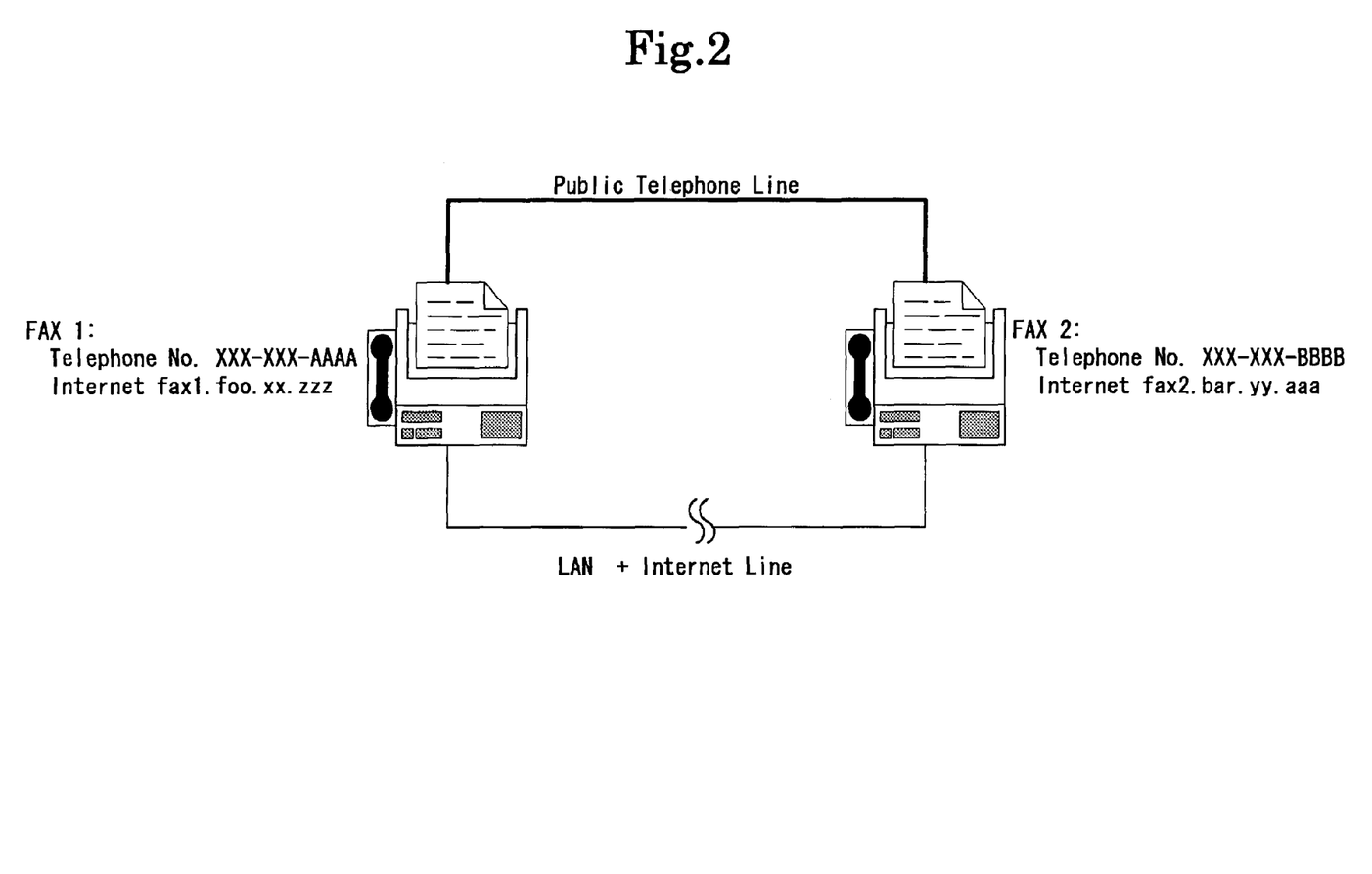
FIG. 2 shows an example of a data communication system construction wherein a data communication apparatus 1 is mutually connected to an analogous apparatus.

FIG. 2 shows an example of a data communication system construction wherein a data communication apparatus 1 is mutually connected to an analogous apparatus. To facilitate the description, the data communication apparatus (FAX1) on the left side is referred to as [data communication apparatus 1], and the data communication apparatus (FAX2) on the right side is referred to as [data communication apparatus 2] (similarly, in FIGS. 6 to 12 hereafter).

Referring to FIG. 2, the data communication apparatus 1 and the data communication apparatus 2 are connected over a public telephone line and internet line via LAN (hereinafter referred to as LAN+internet line). Accordingly, each data communication apparatus has its own telephone number (FAX number), and internet address (hereinafter both are referred to as "addresses").

In FIG. 2, the telephone number of the data communication apparatus 1 is "XXX-XXX-AAAA", and the internet address is "fax1.foo.xx.zzz", and the telephone number of the data communication apparatus 2 is "XXX-XXX-BBBB", and the internet address is "fax2.bar.yy.aaa".

Figure 3:
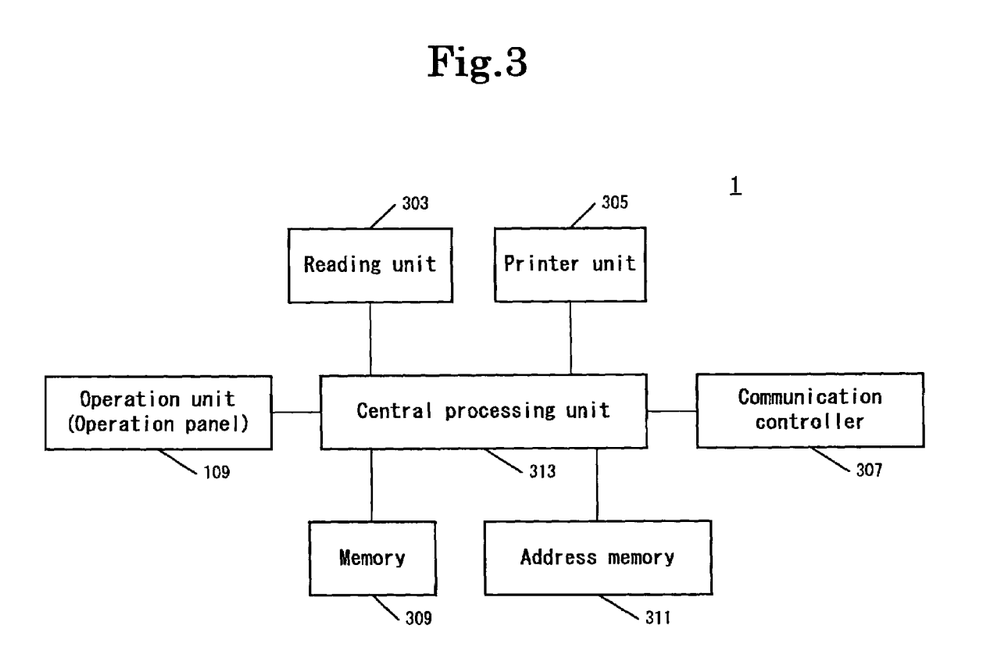
FIG. 3 is a block chart briefly showing the overall structure of the data communication apparatus 1 of an embodiment of the present invention.

FIG. 3 is a block diagram briefly showing the overall construction of the data communication apparatus of the embodiment of the present invention. A central processing unit 313 controls the entire apparatus. The operation unit (operation panel) 109 specifies the transmission destination, and sets the various modes and the like. A reading unit 303 reads the document image at a specified resolution. A communication controller 307 transmits data read by the reading unit 303 to the data communication apparatus 2, and receives data transmitted from the data communication apparatus 2. The print unit 305 outputs data received by the communication controller 307 at a specified resolution. An address memory 311 stores the addresses (internet address, telephone number and the like) of the transmission destinations (communicant destination) recorded by a one-touch dial key or the like. A memory unit 309 is a work area for the central processing unit 313, and stores control programs and received data and the like.

In FIG. 3, the communication controller 307 is connected to a public telephone line and LAN+internet line, and selects a suitable line in accordance with the situation, and transmits and receives data using the selected line.

The data communication apparatus 1 transmits image data together with its own plurality of address data (telephone number and internet address) when transmitting data to the data communication apparatus 2. Furthermore, when the data communication apparatus 1 receives a plurality of address data belonging to the data communication apparatus 2 together with image data transmitted from the data communication apparatus 2, the data communication apparatus 1 records the plurality of the addresses data of apparatus 2 in the address memory 311.

Figure 4:
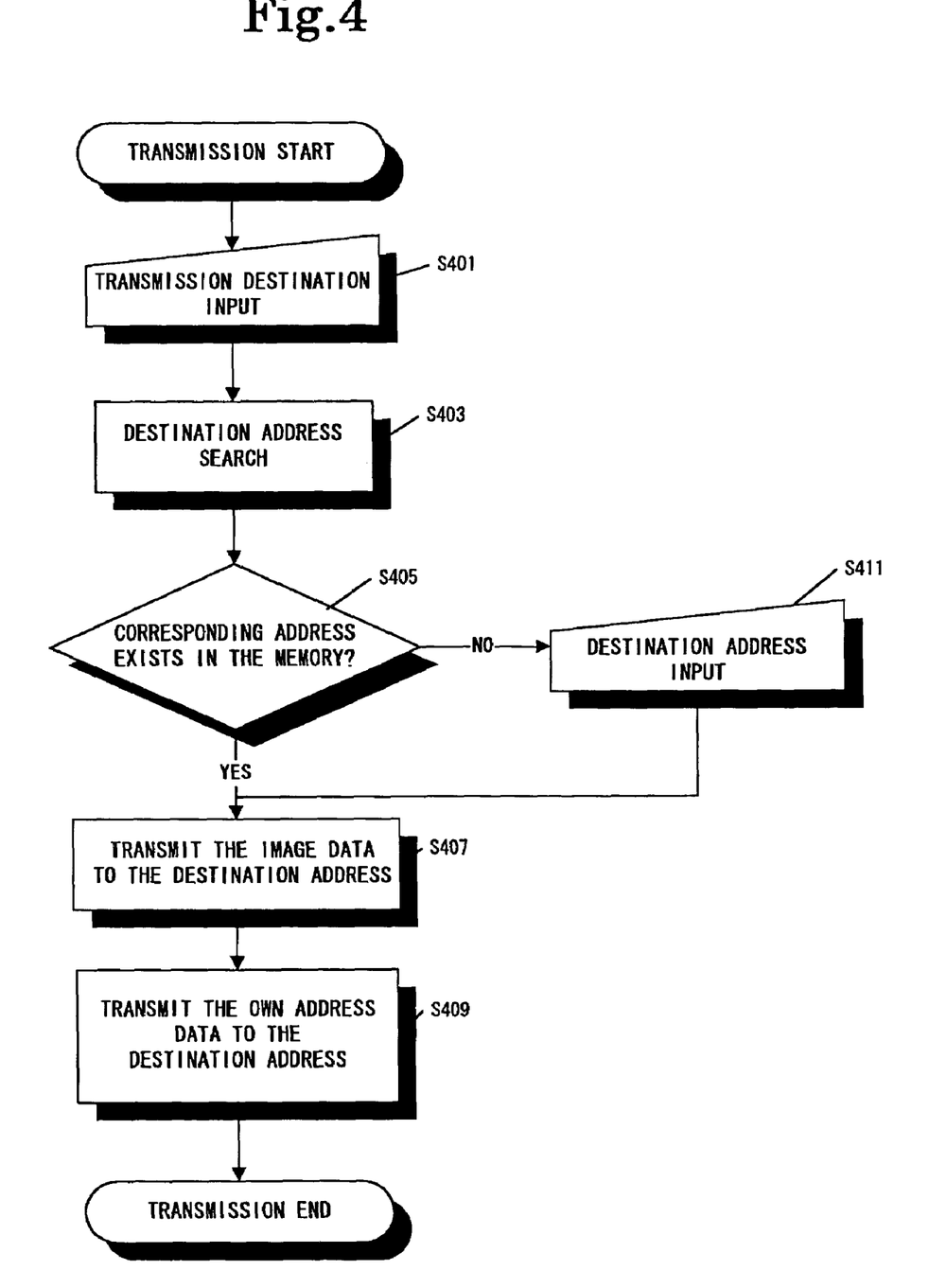
FIG. 4 is a flow chart showing the processing flow when the data communication apparatus 1 transmits data.

FIG. 4 shows a flow chart of the processing flow when the data communication apparatus 1 transmits data. Referring to FIG. 4, in step S401, the operator specifies a transmission destination from the operation unit 109. Then, in step S403, the address memory 311 is searched to obtain the communicant destination address corresponding to the specified transmission destination.

Next, in step S405, a determination is made as to whether or not a corresponding address exists in the address memory 311. If a corresponding address exists in the address memory 311, then in step S407 the image data are transmitted to the communicant destination address. However, when a corresponding address does not exist in the address memory 311, the operator inputs the communicant destination address in step S411.

Then, in step S409, the plurality of address data (telephone number and internet address) of the apparatus 1 itself are transmitted to the same communicant destination as the transmission destination of the image data. Then, the transmission process ends.

Figure 5:
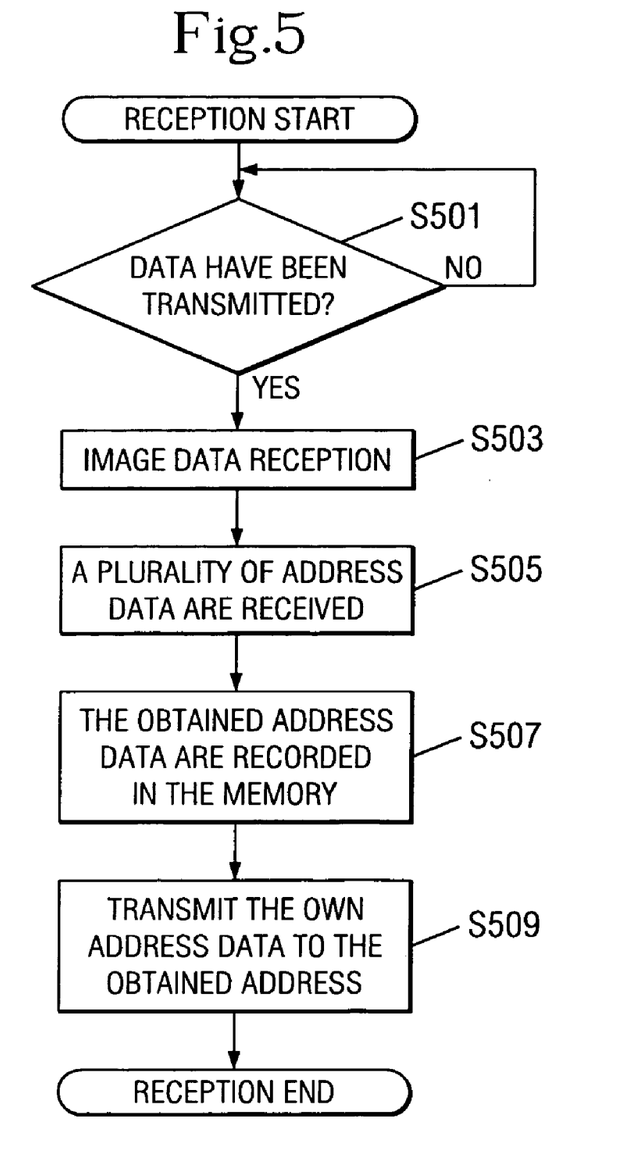
FIG. 5 is a flow chart showing the processing flow when the data communication apparatus 1 receives data.

FIG. 5 is a flow chart showing the processing flow when the data communication apparatus 1 receives data. Referring to FIG. 5, in step S501, a determination is made as to whether or not data have been transmitted from the data communication apparatus 2. Then, when data have been received, in step S503, the image data are received by the communication controller 307.

Then, in step S505, a plurality of address data (FAX number and internet address) are received from the sending side, i.e., the data communication apparatus 2. In step S507, the obtained address data of the data communication apparatus 2 are recorded in the address memory 311.

In step S509, the plurality of address data of the apparatus 1 itself are transmitted to the obtained address of the data communication apparatus 2, and the reception process ends.

Figure 6:
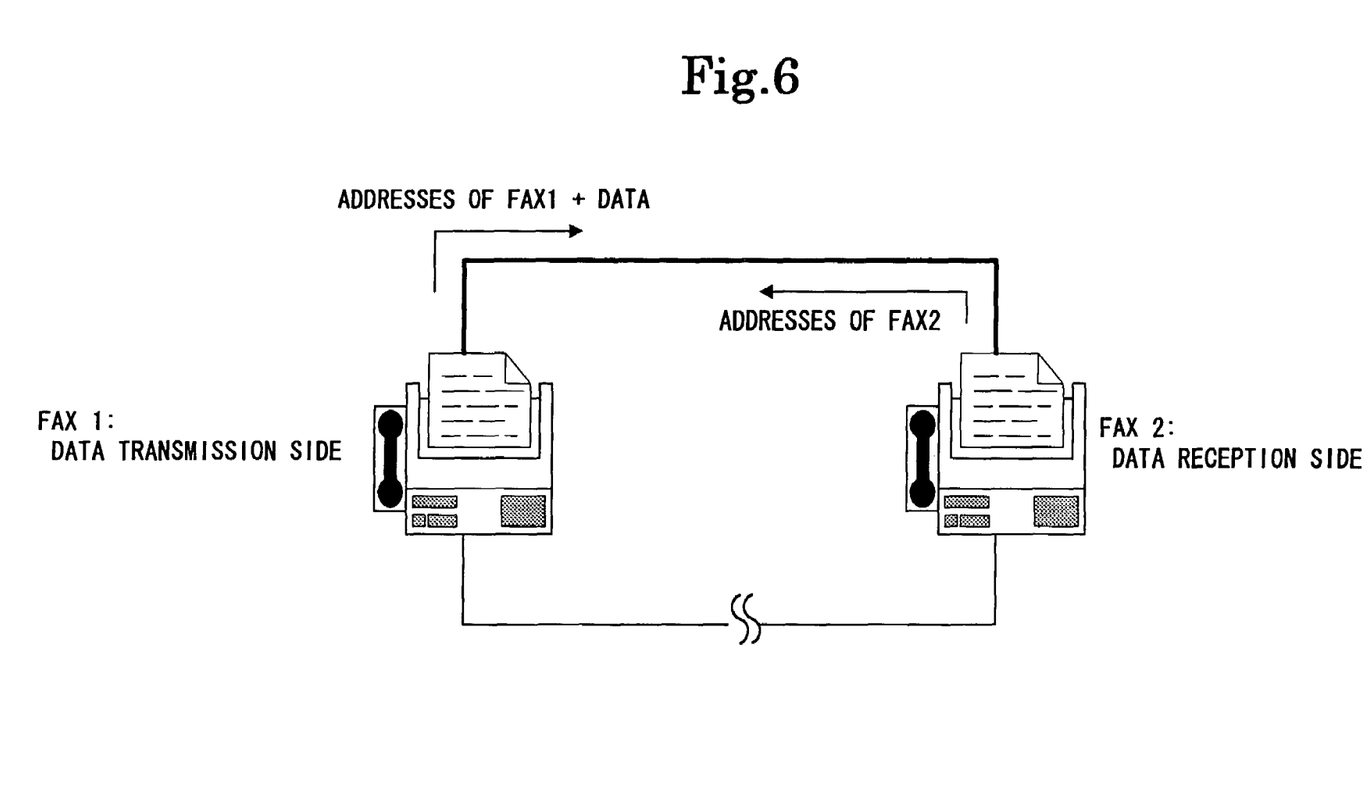
FIG. 6 illustrates the initial data transmission using a public telephone line from a data communication apparatus 1 to a data communication apparatus 2 in the data communication system shown in FIG. 2.

The transmission process and the reception process are described specifically below with reference to FIGS. 6 to 10. FIG. 6 illustrates the initial data transmission using a public telephone line from the data communication apparatus 1 to the data communication apparatus 2 in the data communication system shown in FIG. 2.

As shown in FIG. 6, the sending side, i.e., data communication apparatus 1 transmits normal image data and the addresses of the data communication apparatus 1, i.e., a telephone number "XXX-XXX-AAAA" and internet address "fax1.foo.xx.zzz" to the data communication apparatus 2.

Figure 7:
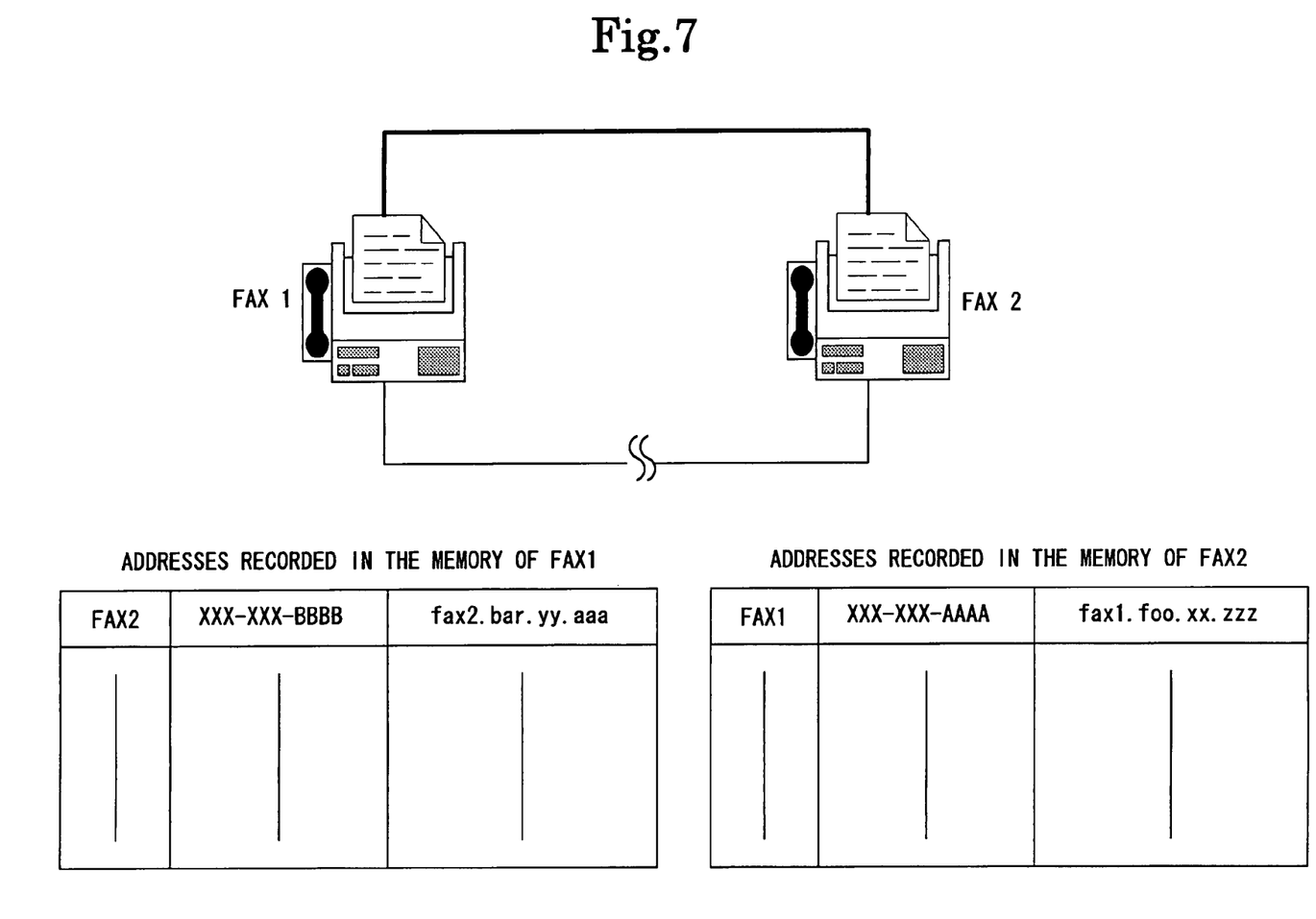
FIG. 7 shows an example of recording of the address memory 311 in each data communication apparatus when the initial data transmission of FIG. 6 ends.

FIG. 7 shows an example of recording of the address memory 311 in each data communication apparatus when the initial data transmission of FIG. 6 ends. As shown in FIG. 7, when the initial data transmission ends, mutual address data are recorded in each address memory 311.

That is, the plurality of address data of the data communication apparatus 1 are recorded in the address memory 311 of the data communication apparatus 2 via the transmission process of the data communication apparatus 1. Then, the plurality of address data of the data communication apparatus 2 are recorded in the address memory 311 of the data communication apparatus 1 via the transmission process of the data communication apparatus 1.

As a result, the identification information [FAX2] of the data communication apparatus 2 and the telephone number "XXX-XXX-BBBB" and internet address "fax2.bar.yy.aaa" associated with the identification information are recorded in the address memory 311 of the data communication apparatus 1. Furthermore, the identification information [FAX1] of the data communication apparatus 1 and the telephone number "XXX-XXX-AAAA" and internet address "fax1.foo.xx.zzz" associated with the identification information are recorded in the address memory 311 of the data communication apparatus 2.

As described above, at the moment the initial transmission ends from the data communication apparatus 1 to the data communication apparatus 2 using a public telephone line, a plurality of addresses of each apparatus are automatedly reciprocally recorded. Accordingly, the operation of manually recording addresses is deleted, thus greatly reducing the burden on each operator. In particular, since only the plurality of address data of the communicants on the sending and receiving sides are recorded, new correction processes (addition and deletion of address data) are eliminated, and the operating environment prior to the recording is undisturbed.

Figure 8:
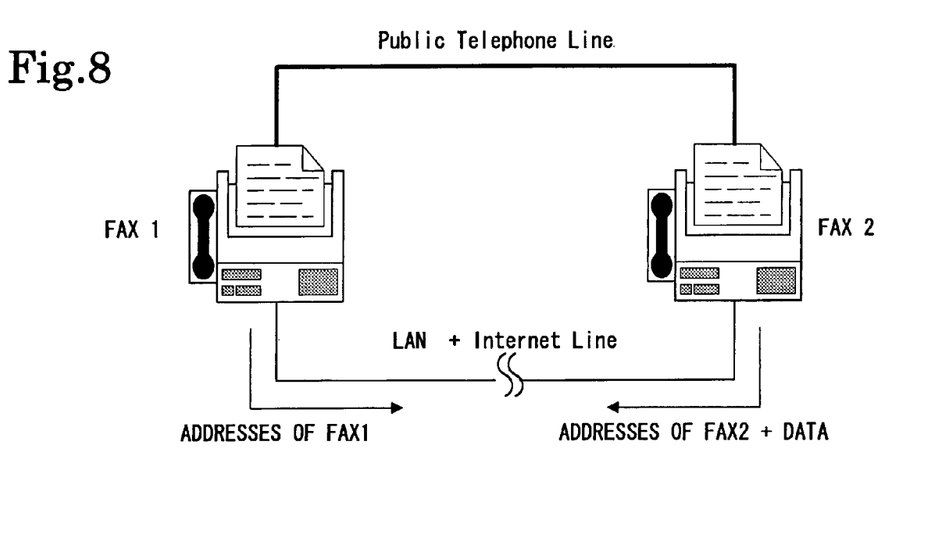
FIG. 8 shows the second and subsequent transmission processes after the end of the initial data transmission of FIGS. 6 and 7.

FIG. 8 shows the second and subsequent transmission processes after the end of the initial data transmission of FIGS. 6 and 7. FIG. 8 illustrates the situation when data are transmitted from the data communication apparatus 2 to the data communication apparatus 1 over the internet line.

As shown in FIG. 8, the address memory 311 of the data communication apparatus 2 records an internet address as well as the telephone number for the data communication apparatus 1. For this reason, when the transmission destination is specified by apparatus name or telephone number by the operator of the data communication apparatus 2, a plurality of address data recorded in the address memory 311 are searched. Then, "FAX1:XXX-XXX-AAAA: fax1.foo.xx.zzz" is obtained as the search result.

A suitable address for this transmission, i.e., the internet address "fax1.foo.xx.zzz" is selected from the obtained search result. Then, data are transmitted to the selected address (from data communication apparatus 2 to the data communication apparatus 1) over the LAN and internet line.

During this data transmission, the respective plurality of addresses are again transmitted. For this reason, the content of the recording of the address memory 311 remains intact and unchanged insofar as there is not change in the telephone number and internet address.

Figure 9:
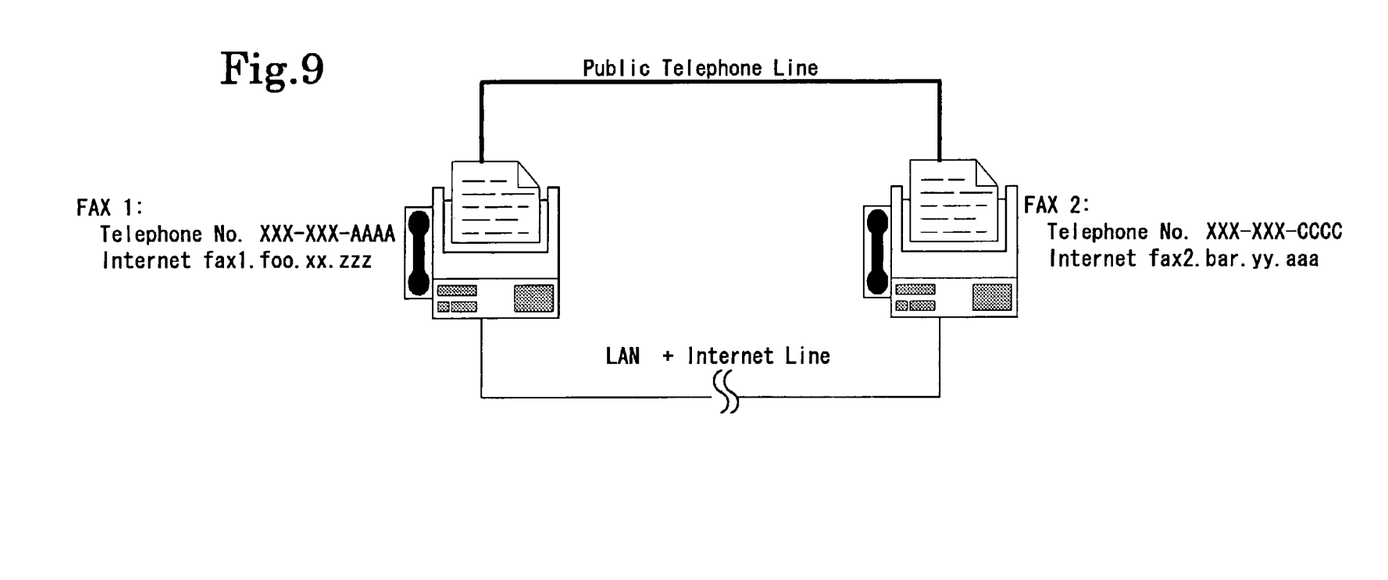
FIG. 9 illustrates a change of the address of one of the data communication apparatuses.

The situation when the address of one of the data communication apparatuses has changed is described below with reference to FIG. 9. In FIG. 9, consider that the plurality of addresses of the data communication apparatus 1 are all unchanged, whereas the telephone number of the data communication apparatus 2 has changed from "XXX-XXX-BBBB" to "XXX-XXX-CCCC".

Figure 10:
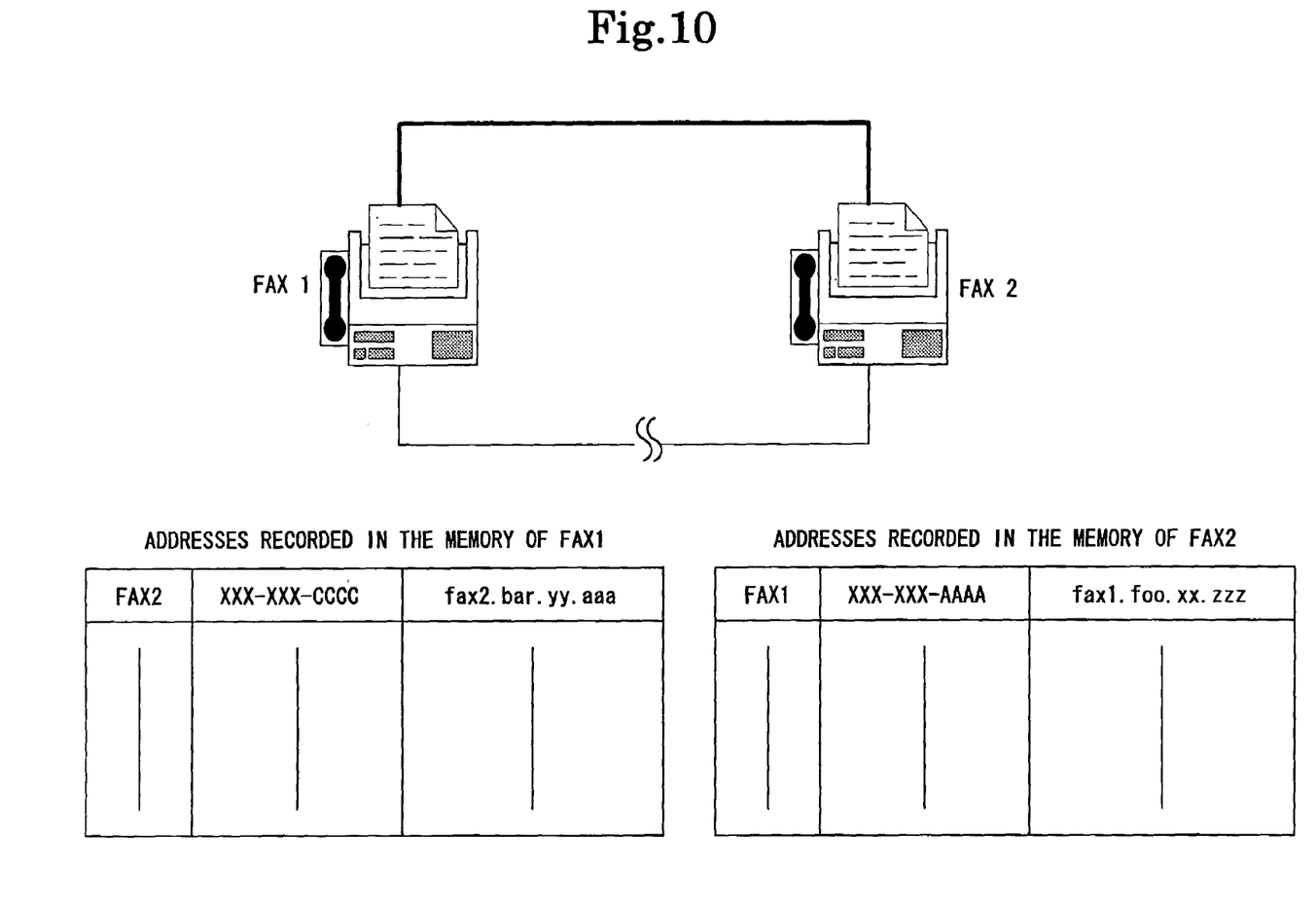
FIG. 10 shows a recording example of the address memory 311 in a data communication apparatus 1 when data transmission from one to another apparatus ends.

In this case, at the moment the data transmission ends from either apparatus to the other, the old (pre-change) telephone number of the data communication apparatus 2 is changed and the new (post change) telephone number is recorded in the address memory 311 of the data communication apparatus 1.

Accordingly, when data are once transmitted, the changed address is recorded automatically even when the address has changed. Therefore, the address data recording operation required when the address is changed becomes unnecessary, and the labor of the operator is greatly reduced.

Figure 11:
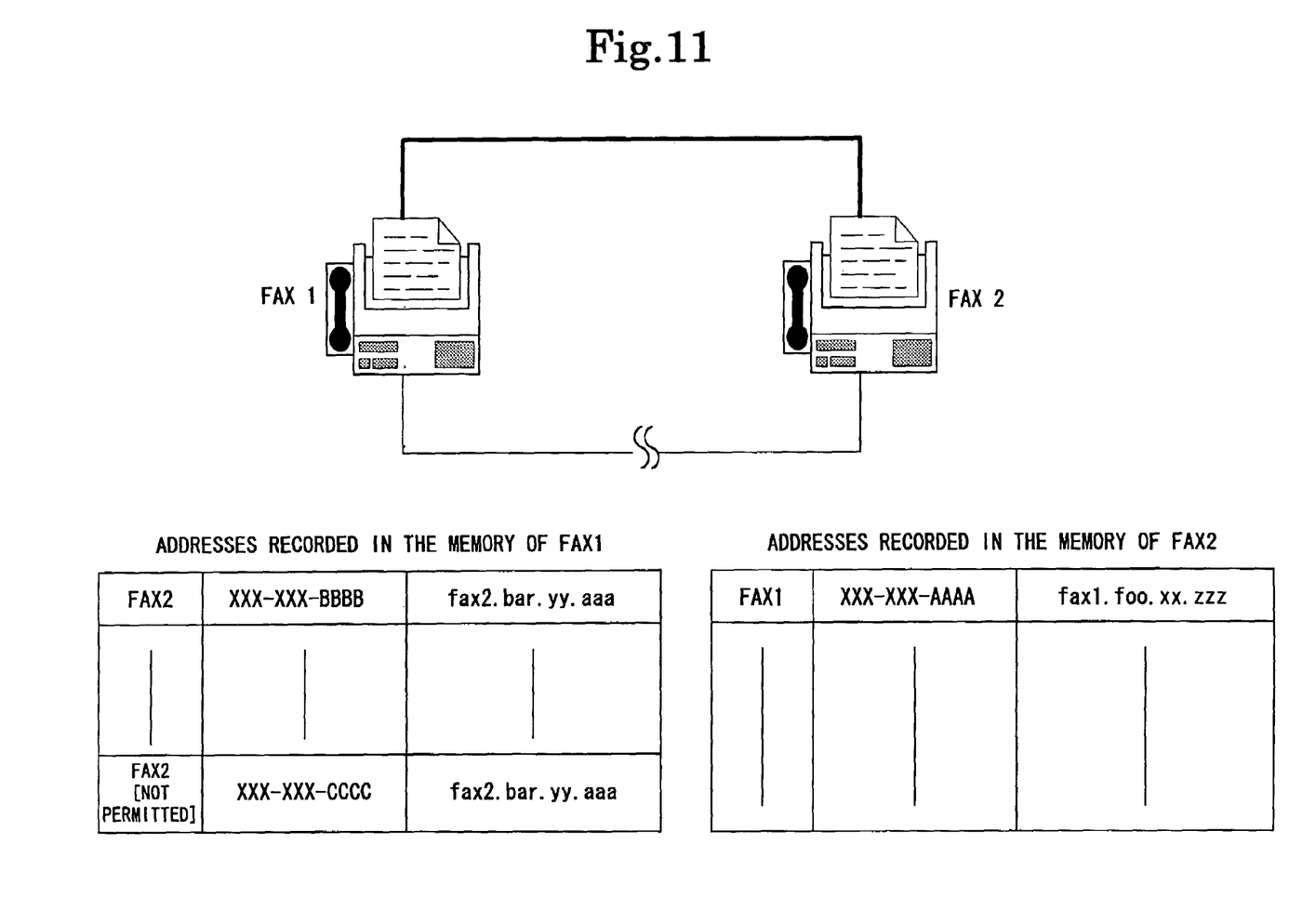
FIG. 11 shows another example when the address of the data communication apparatus 2 has changed.

A second embodiment of the invention is described below. In the second embodiment the basic construction is identical to that of the data communication apparatus 1, but the reception process sequence is slightly different when the transmitted address has changed. FIG. 11 shows another example when the address of the data communication apparatus 2 has changed in the second embodiment. Specifically, when the telephone number of the data communication apparatus 2 has changed from "XXX-XXX-BBBB" to "XXX-XXX-CCCC".

In this case, when the data transmission ends from either apparatus to the other, the old previously recorded telephone number of the data communication apparatus 2, i.e., "XXX-XXX-BBBB", is present and unrevised in the address memory 311, and the new telephone number, i.e., "XXX-XXX-CCCC" is recorded.

This new telephone number is still in a prohibited state and cannot be used. Accordingly, the information [not permitted] is also recorded. Then, in this state, the new telephone number cannot be used because the operator has not permitted its use, and only the old telephone number can be used.

Figure 12:
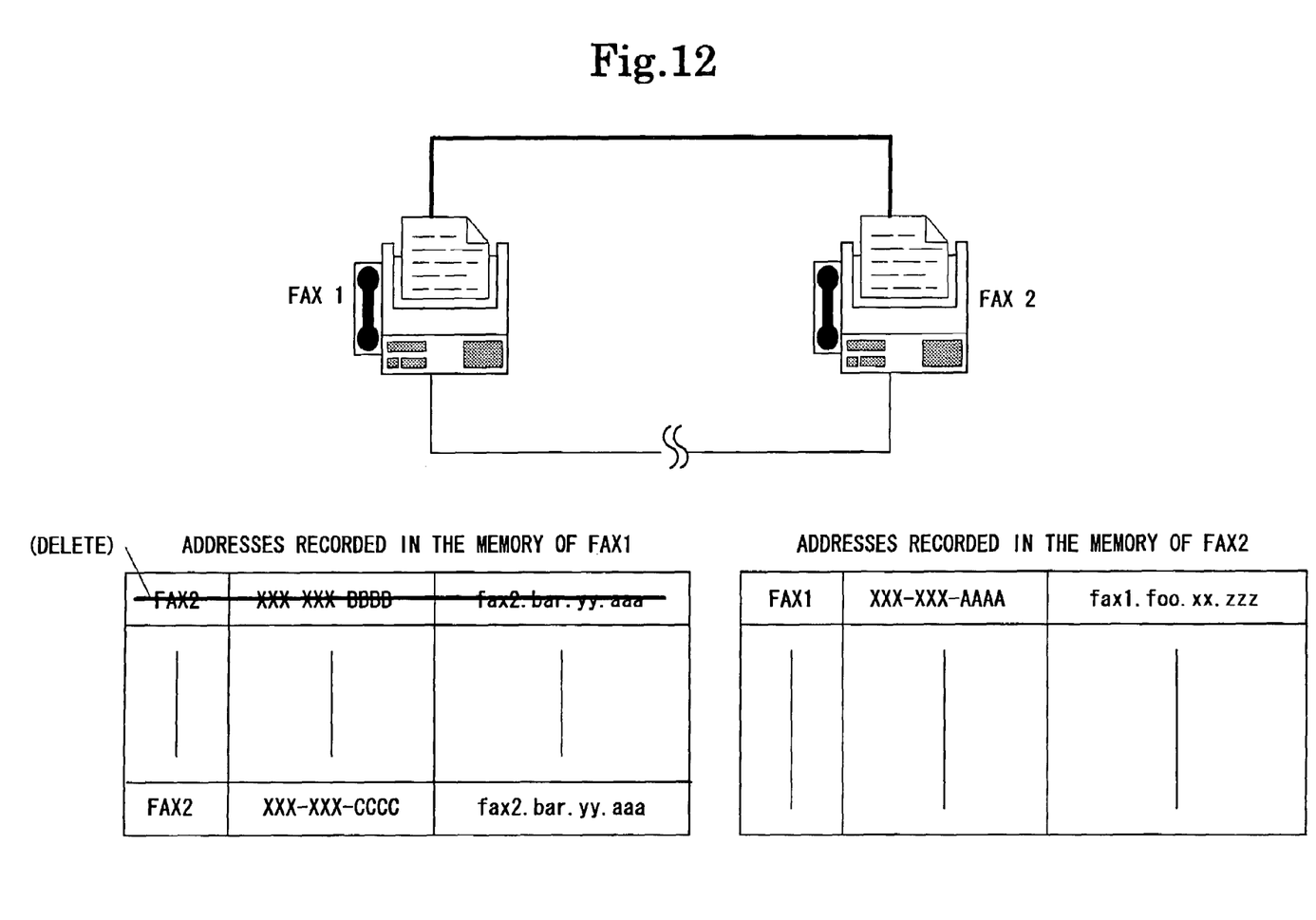
FIG. 12 illustrates a change of the address data of the data communication apparatus 2 stored in the address memory 311 in the data communication apparatus 1.

FIG. 12 illustrates a change of the address data of the data communication apparatus 2 stored in the address memory 311 in the data communication apparatus 1. When the operator permits use of the changed telephone number of the data communication apparatus 2, the previously recorded old telephone number is deleted, and the information [not permitted] of the new telephone number is also deleted. Accordingly, this is the first time the new telephone number can be used.

In the second embodiment described above, when address data have changed, the address data are not immediately changed to the new address data, and the revision does not occur until the operator grants permission. For this reason, the situation can be avoided whereby address data are erroneously revised by a prank data transmission or the like against the intention of the operator.

In the above embodiments, a plurality of address data of the apparatus itself are normally transmitted together with the normal image data transmission. However, a plurality of address data of the apparatus itself also may be transmitted, for example, only when an address data transmission request is received from the communicant side. Furthermore, although the address data transmission and reception occurs after image data transmission and reception, the address data transmission and reception may be performed before or during image data transmission and reception.

According to this invention, the data communication apparatus transmits a plurality of its own address data in addition to normal transmission of image data. Accordingly, new correction processing and the like is unnecessary at the transmission destination, thereby reducing the recording operation for address data at the communicant destination while maintaining a conventional operating environment.

Furthermore, according to this invention, the data communication apparatus records a plurality of address data of another data communication apparatus. Accordingly, new correction processing and the like by an operator is unnecessary, thereby reducing the recording operation for address data of the communicant destination while maintaining a conventional operating environment.

Although the present invention has been fully described by way of examples with reference to the accompanying drawings, it is to be noted that various changes and modification will be apparent to those skilled in the art. Therefore, unless otherwise such changes and modifications depart from the scope of the present invention, they should be construed as being included therein.

What is claimed is:

1. A data communication apparatus capable of connecting to a plurality of communication lines, comprising:
    a specification unit for specifying a transmission destination;
    a transmission unit for transmitting a plurality of its own address data corresponding to each of the plurality of communication lines to the specified transmission destination;
    a receiving unit for receiving a plurality of address data from a data communication apparatus at the transmission destination;

a recording unit for recording the address data received by the receiving unit without updating previously recorded address data corresponding to the specified transmission destination; and a controller adapted to prevent use of the recorded received address data until authorized responsive to a user input.

2. The data communication apparatus according to claim 1, wherein said transmission unit transmits the address data together with image data.

3. The data communication apparatus according to claim 1 further comprising a memory for storing the address data.

4. The data communication apparatus according to claim 1, wherein the controller is adapted to search the recording unit for an address corresponding to the specified transmission destination.

5. The data communication apparatus according to claim 4, wherein the controller is adapted to retrieve an address from the recording unit when an address corresponding to the specified transmission destination is found, and to prompt a user to provide an address when an address corresponding to the specified transmission destination is not found.

6. The data communication apparatus according to claim 1, wherein the recording unit is adapted to update previously recorded addresses with the recorded received address data responsive to the user input.

7. The data communication apparatus according to claim 1, wherein the controller causes an indication to be set that the received address data is not authorized for use.

8. The data communication apparatus according to claim 7, wherein the controller, responsive to the user input, causes the recording unit to delete the previously recorded address data and to clear the indication.

9. A data communication apparatus capable of connecting to a plurality of communication lines, comprising:

a receiving unit for receiving a plurality of address data from another data communication apparatus;

a recording unit for recording the address data received by the receiving unit without updating previously recorded address data corresponding to the specified transmission destination;

a transmission unit for transmitting a plurality of its own address data to the other data communication apparatus; and a controller adapted to prevent use of the recorded received address data until authorized responsive to a user input.

10. The data communication apparatus according to claim 9, wherein said own address data are corresponding to each of the plurality of communication lines.

11. A method of data communication comprising:

specifying a transmission destination;

transmitting a plurality of its own address data corresponding to each of a plurality of communication lines to the specified transmission destination;

receiving from the specified transmission destination address data corresponding to the address of at least two communication lines to which the specified transmission destination is connected; and storing the received address data in a memory without updating previously recorded address data corresponding to the specified transmission destination;

prohibiting use of the recorded received address data; and permitting use of the recorded received address data responsive to a user input.

12. The method of claim 11, further comprising:

obtaining an address of the specified transmission destination by retrieving from a memory a plurality of addresses corresponding to the specified transmission destination and selecting one of the retrieved plurality of addresses.

13. A data communication device capable of being coupled to a plurality of communication lines, the data communication device comprising:

a first memory for storing a plurality of addresses at which the data communication device can be reached; and a communication controller for communicating with another data communication device over one of the plurality of communication lines, wherein the communication controller is adapted to send to the other data communication device the plurality of addresses and to receive from the other data communication device a plurality of addresses at which the other data communication device can be reached;

a second memory for storing the received addresses; and a controller adapted to prevent use of the recorded received address data until authorized responsive to a user input.

14. The data communication device according to claim 13 further comprising:

a user interface adapted to accept from a user an identification of another data communication device; and a processor programmed to retrieve from the second memory a plurality of addresses for the user identified data communication device.

15. A data communication apparatus capable of connecting to a plurality of communication lines, comprising:

a specification unit for specifying a transmission destination;

a transmission unit for transmitting a plurality of its own address data corresponding to each of the plurality of communication lines to the specified transmission destination;

a receiving unit for receiving a plurality of address data from a data communication apparatus at the transmission destination;

a recording unit for recording the address data received by the receiving unit; and a controller adapted to cause the transmission unit to transmit the plurality of its own address data regardless of which one of the plurality of communication lines is used for transmission.

* * * * *